Feb. 20, 1951 E. N. BURROWS 2,542,310
ANIMAL TRAP
Filed April 5, 1945

Inventor
Edwin N. Burrows
By Barthel & Bugbee
Attorneys

UNITED STATES PATENT OFFICE 2,542,310

ANIMAL TRAP

Edwin N. Burrows, Royal Oak, Mich.

Application April 5, 1945, Serial No. 586,655

1 Claim. (Cl. 43—81)

The present invention relates to improvements in animal traps, and more particularly to a modified trigger and bait-holding mechanism therefor.

The primary object of the invention is to provide a trap which may be easily set off when a portion of the bait is touched or moved by the animal.

Another object of the invention is to provide an animal trap having a modified trigger and bait-holding mechanism which is more sensitive than present-day animal traps.

Another object of the invention is to provide an animal trap having a bait-holder which is economically constructed and arranged so as to eliminate the use of a pivoted or movable bait holder and arranged to engage the trigger arm in such a manner as to hold the trigger arm and the swinging striking jaw of the trap in a set position until the bait is removed by an animal gnawing thereon.

Another object of the invention is to provide an animal trap having a stationary trigger arm locking member provided with a slot for receiving the free end of the trigger arm so that the bait may be interposed between the trigger arm and the keeper in a novel and unique manner.

Another object of the invention is to provide an animal trap having a bait-holder which is so arranged that it will prevent the swinging striker arm or jaw from being accidentally set off and striking the finger or hand of the person setting the trap.

Other objects and advantages of the invention will become apparent during the course of the following description of the accompanying drawing, wherein.

Figure 2:
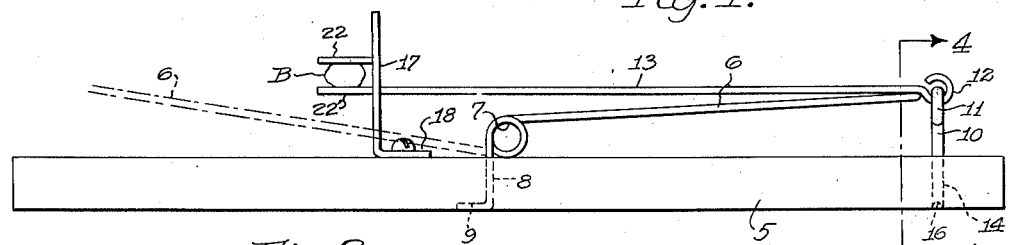
Figure 2 is a side elevational view of the animal trap further showing the manner in which the trigger arm is arranged with the bait disposed between one end thereof and the keeper when the swinging striking jaw is in its set position.
Figure 3:
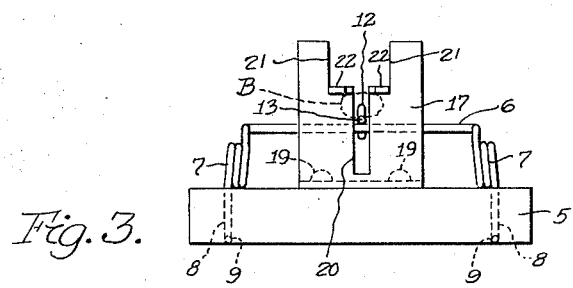
Figure 4:
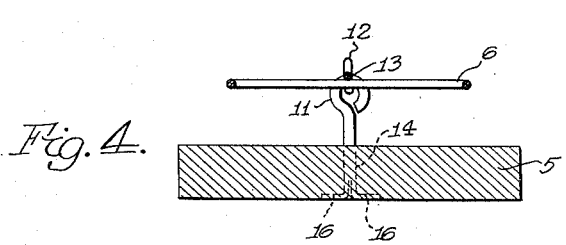

Figure 3 is an end elevational view of the animal trap showing the slotted portion of the trigger arm keeper and the projecting portion of the keeper for engaging the bait; and Figure 4 is a vertical cross sectional view taken on line 4—4 of Figure 2 looking in the direction of the arrows and showing the manner in which the trigger arm is pivoted to the base for holding the swinging striking jaw in its set position.

Figure 1:
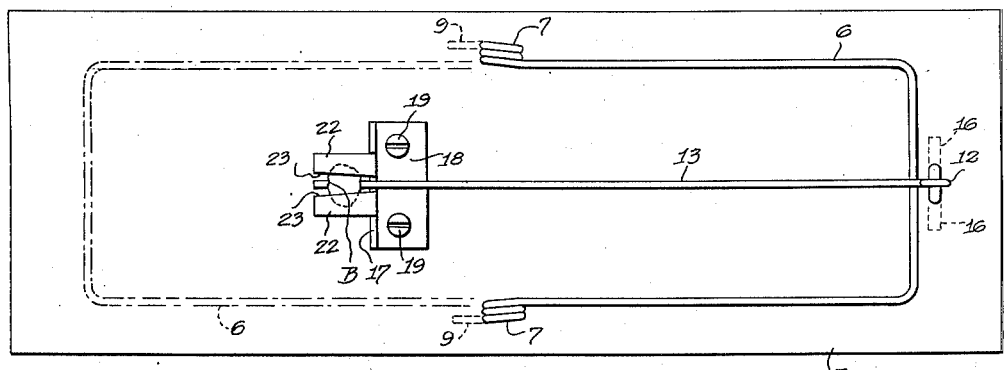
Figure 1 is a top elevational view of an animal trap showing the modified trigger arm keeper and the manner in which the bait is interposed between the keeper and the trigger arm.

In the drawing, the reference character 5 will generally be employed to designate the base of the animal trap which may be constructed of wood or metal. The base 5 is of rectangular shape as shown in Figure 1.

Affixed to the base 5 at the central portion thereof and at each edge are the ends of a U-shaped striking jaw 6 which are coiled as at 7 and have their free ends 8 extending through suitable apertures in the base 5, and angularly bent as at 9 so as to anchor the swinging striking jaw 6 in place. The swinging striking jaw is formed of spring wire so that the coil portion 7 will place the swinging striking jaw 6 under tension to normally assume the position as shown by the dotted lines in Figures 1 and 2.

Secured to one end of the rectangular base 5 is an eyelet pin 10 having an eye 11 at one end thereof to which is pivotally attached the looped end 12 of a trigger arm 13. The shank of the eyelet pin 10 extends through an opening 14 in the base 5 and is anchored therein by splitting the end and bending the split portions 16 as shown in Figure 4.

A combined bait holder and trigger arm keeper 17 is secured to the base 5 and said bait holder and keeper 17 has the lower portion thereof formed with a bracket plate 18 having suitable apertures for receiving anchoring screws 19. The upstanding portion of the combined bait holder and trigger arm keeper 17 is slotted as at 20 for receiving the free swinging end 22' of the trigger arm 13 therebetween, as shown clearly in Figures 1 to 3 inclusive. The upper portion of the upstanding, swinging trigger arm keeper 17 is struck out to provide a pair of laterally extending, spaced apart, bait engaging projections 22. Flanked by a pair of upwardly-extending spaced wings 21 at the top of the keeper 17, outside the projections 22. These wings 21 serve as guards to shield the bait and prevent the animal from standing alongside the trigger arm 13 and reaching its head over the top of the keeper 17 to eat the bait without being caught by the jaw 6. The inner edges 23 of the bait-engaging portions 22 may be tapered slightly so as to provide a slot therebetween of a greater width at the free end thereof.

The bait B is adapted to be interposed between the free swinging end 22' of the trigger arm 13 and the bait-engaging projections 22 so that when an animal such as a mouse or the like attempts to eat the bait, it will be necessary to reach under the projections 22 so that the animal can grab the bait in its mouth,

Operation of the invention

The animal trap is adapted to be set by swinging the striking jaw 6 to the full line position shown in Figures 1 to 4 under the tension of the coiled spring section 7 so that the swinging trigger arm 13 may be placed thereover with the free end extending within the slot 20 formed in the upstanding swinging trigger arm keeper 17. By then inserting the bait B beneath the lateral projections 22, the trigger arm 13 may be released so that the free end will engage the under side of the bait and hold the trigger arm as well as the swinging striking jaw 6 in position.

When an animal attempts to eat the bait B, the same will be displaced so as to release the swinging trigger arm 13 and permit the striking jaw 6 to swing to the dotted line position (Figure 1) so as to strike and catch the animal by impaling him against the base 5.

In the event that the base 5 is constructed of metal, the upstanding trigger arm keeper 17 and bait holder may be formed by striking the same out of the base or punching the same therefrom to provide an upstanding portion having a slot extending centrally thereof and a pair of lateral projections one at each side of said slot to provide bait-engaging portions. The remaining parts of the animal trap will be constructed similar to the manner in which they are shown and described in connection with the wooden base 5.

It is to be understood that the form of the invention herewith shown and described is to be taken as a preferred embodiment of the same and that various changes may be made in the shape, size and arrangement of parts without departing from the spirit of the invention or the scope of the subjoined claim.

What I claim is:

An animal trap, comprising a rectangular base, a U-shaped swinging striking jaw formed of spring wire having the ends thereof coiled and anchored in the base to yieldingly urge the striking jaw into engagement with the base, a trigger arm having one end pivoted to the base and arranged to overlie the connecting portion of the U-shaped striking jaw, an upstanding plate-like angle bracket secured to the base with one of its angled portions extending perpendicular thereto and having a slot in the center thereof for receiving the free swinging end of the trigger arm, a pair of spaced apart lugs struck out horizontally from said upstanding angle bracket on each side of said slot to provide bait-engaging projections so that the trigger arm will be held thereunder when the swinging striking jaw is in its set position, and a pair of laterally spaced plate-like bait-shielding wings mounted on said upstanding angle bracket outside said lugs and extending upwardly therefrom.

EDWIN N. BURROWS.

REFERENCES CITED

The following references are of record in the file of this patent:

UNITED STATES PATENTS

| Number | Name | Date |
|---|---|---|
| 646,989 | Hooker | Apr. 10, 1900 |
| 793,349 | Chasse | June 27, 1905 |
| 871,989 | Gates | Nov. 26, 1907 |
| 1,485,976 | Gibbs | Mar. 4, 1924 |
| 1,930,886 | Scott | Oct. 17, 1933 |

FOREIGN PATENTS

| Number | Country | Date |
|---|---|---|
| 380,264 | Great Britain | Sept. 15, 1932 |